United States Patent Office 3,076,699
Patented Feb. 5, 1963

3,076,699
GRANULAR HERBICIDAL COMPOSITION AND METHOD
Victor A. Renner, Marysville, Ohio, assignor to The I. M. Scott & Sons Company, Marysville, Ohio, a corporation of Ohio
No Drawing. Filed Oct. 4, 1960, Ser. No. 60,287
23 Claims. (Cl. 71—2.4)

This invention is a continuation-in-part of my application Serial No. 659,486, filed May 16, 1957, which is a continuation-in-part of application Serial No. 172,679, filed July 8, 1950, both abandoned, and relates to herbicidal compositions comprising finely divided herbicides adhered to finely divided particles of a solid carrier material by means of a sticking agent adsorbed on the particles, and to methods for making the same. The resulting herbicidal composition is free-flowing, substantially dust-free and is particularly suited for the selective control of noxious weeds and the like.

Various dry formulations of herbicide compositions for controlling noxious plants have been tried heretofore. However, such prior dry formulations have some serious shortcomings and problems. In particular, the dry herbicidal formulations heretofore used have presented a serious dust problem because substantial quantities of fines or dust are raised from the herbicide formulation when it is applied. (Dust has been defined as all solid particles capable of being suspended in the air, usually from 1–150 microns in diameter.) Such prior herbicide compositions usually contain as active ingredient some chemical compound, like arsenic or phenyl mercuric which is toxic to humans and other mammals, so that dust arising from the herbicide formulations during their application may have harmful effects. In fact, in some states it is unlawful to use or sell dry formulations of certain herbicidal compositions which contain dust. Furthermore, the fines or dust of prior dry herbicidal formulations float in the air currents and drift onto adjoining vegetation such as garden crops and flowers, so that such prior dry formulations cannot be safely applied on home lawns or other areas adjacent desirable plants which may be adversely affected by the herbicide.

Another problem with prior dry herbicide formulations is that the active ingredient of the herbicide is rapidly removed rfom the carrier by wind action, or washing by the mechanical action of rain or soil water for example, so that the active herbicide ingredient is not in contact with the treated plant as long as it should be to be fully effective. Still another disadvantage of some prior dry formulations is that they are not free-flowing and thus cannot be easily applied in desired controlled quantities by mechanical means like conventional lawn spreaders.

Accordingly, it is a primary object of the present invention to provide a dry herbicide composition especially suited for selective control of noxious weeds and the like.

A further object is to provide a dry herbicide composition especially suited for selective control of weedy grasses and like plants in which the active ingredient is firmly adhered to a dry carrier so that the herbicide composition is dust free. It is a related object to provide such a herbicide which virtually eliminates release of toxic dusts during application.

It is another main object to provide a dry herbicide formulation especially suited for selective plant treatment in which the active ingredient is firmly adhered to a carrier so that the active ingredient is not quickly removed by wind action, or rain or soil water wash, and therefore is in contact with the treated plants for a long time so that it is more effective.

It is still another object to provide such a dry herbicidal composition which is free-flowing so that it can be easily applied in controlled quantities by such means as conventional lawn spreaders.

Another object of this invention is to provide a free-flowing substantially dust-free herbicidal composition of matter which comprises a carrier of finely divided expanded vermiculite with a finely divided herbicidal compound adhering to the vermiculite by means of a film of sticking agent firmly adsorbed on the surfaces of the vermiculite. It is a related object to provide such a herbicide composition incorporating a surface active agent for increased effectiveness.

Another object of this invention is to provide a safe, dust-free, dry formulation arsenic compound herbicide especially effective for late post emergence control of annual weedy grasses.

Another object of the invention is to provide a method of making a free-flowing substantially dust-free herbicidal composition achieving the above objects and advantages. It is a related object to provide such a method in which finely divided particles of a herbicide are admixed with finely divided expanded vermiculite, and preferably a surface active agent also, and this mixture sprayed with a polyhydric alcohol.

Other objects and advantages of the invention will appear hereinafter from the following detailed description and claims.

The preferred free-flowing, substantially dust-free composition of this invention has a formulation comprising finely divided expanded vermiculite particles, a polyhydric alcohol, and an organo arsenical. The organo arsenical is in finely divided or powdered form and adheres to the vermiculite particles by means of a film of the polyhydric alcohol which is firmly adsorbed on the surfaces of the vermiculite. A surface active agent is also preferably included in the formulation.

A size of finely divided expanded vermiculite which has been found to give good results is No. 4 vermiculite sold by the Zonolite Company of Chicago, Illinois. This No. 4 expanded vermiculite has an average particle size of 420 microns, 95% of which are larger than 210 microns in diameter. Other sizes of vermiculite which vary in mesh sizes of from 16 to 100 may be used with good results. The sizes of vermiculite are based on fractions passing through a given U.S. standard sieve and then being retained by a second sieve of smaller mesh size.

The polyhydric alcohols used in this invention are any of those which are readily adsorbed on the surfaces of vermiculite. The polyhydric alcohol should also have low volatility to prevent ready evaporation under outdoor conditions of use. The hygroscopic nature of the alcohols utilize moisture to progressively release the herbicide. Examples of suitable polyhydric alcohols are ethylene, propylene, dipropylene, triethylene, hexylene glycols; 2,2-diethyl-1,3 propanediol; 2-ethyl-2-butyl-1,3-propanediol; 1,5 pentanediol; 2-ethyl-1,3-hexanediol; as well as the higher molecular weight polyethylene and polypropylene glycols. In practicing the invention, the higher molecular weight polyhydric alcohols may be heated to a temperature of from 60° C. to 140° C. to liquefy and reduce their viscosity. Heating of the lower molecular weight alcohols such as triethylene glycol is not necessary.

Other sticking agents which have been found to provide suitable resutls are: glycol ethers such as methyl Cellosolve, Cellosolve solvent, butyl Cellosolve, 1-butoxy-ethoxy-2-propanol, methyl Carbitol, butyl Carbitol, methoxytriglycol, ethoxytriglycol, and low volatile ketones such as methyl ethyl ketone and diisobutylketone.

The reason materials such as polyhydric alcohols are adsorbed on the surfaces of vermiculite particles may be explained by the chemical and physical structure of the vermiculite, itself. Vermiculite is a micaceous mineral that exfoliates when heated or subjected to certain chemical reactions. It is hydrated magnesium-aluminum-iron silicate of monoclinic crystal structure with pseudo-hexagonal characteristics and possesses a Mohs Scale hardness of 1.5. The chemical composition of ore and expanded vermiculite are identical except for $H_2O$ content. The purpose of expanding vermiculite is to enlarge or increase its porosity or the cellular condition of its laminae.

The platelet-type of laminar structure of vermiculite is directly responsible for the unique surface area and void volume characteristics which appear to be in turn responsible for the physical and chemical properties of the material that cause the polyhydric alcohols to be adsorbed thereon and thereby yield new and unexpectedly improved results in dust-free toxic herbicides. The individual elementary vermiculite platelets are approximately 9.3° A. thick (27,000,000 platelets would produce a stack one inch high). It has been found that the individual platelets are composed of two silica tetrahedral sheets bonded to a central sheet of di-valent ions (primarily $Mg^{++}$) in octahedral configuration, and carry net negative charges due to partial substitution of trivalent aluminum ions for tetravalent silicon ions in the tetrahedral sheets (Grimm, R. E., Clay Minerology, pp. 76-77, McGraw-Hill, 1953). These negative charges, carried by the individual platelets, are balanced by the presence of positively charged cations such as $Mg^{++}$, $Ca^{++}$, and $K^+$ which occupy positions between the platelets. These interplatelet ions are relatively loosely held and may be removed and replaced stoichiometrically by other ions without altering the composition or structure of the platelets. The ion (base) exchange capacity exhibited by vermiculite arises from this source. The cation exchange capacity, determined by treating the vermiculite with neutral ammonium acetate and then analyzing the thoroughly washed samples for nitrogen, was found to be in the order of 19.4 to 22.5 milliequivalents for 100 grams.

Studies have shown that the polyhydric alcohols adsorbed on the surfaces of the vermiculite are very resistant to washing by water and the herbicides are moisture releasable from the carrier. The film of polyhydric alcohol adsorbed on the vermiculite acts as a sticking agent for the organo arsenicals which cause them to adhere to the particles of vermiculite. It should be understood of course that other like finely divided herbicides insoluble in polyhydric alcohols could be made to adhere to the surfaces of the vermiculite by means of the film of polyhydric alcohol adsorbed thereon.

The following herbicides adsorbed onto solid carrier particles have been found to provide particularly good results when used in their preferred practical application:

For the control of crabgrass and other weeds as they emerge or germinate: diphenylacetonitrile, dimethyl tetrachlorterephthalate, 2-chloro-4,6-bis (ethylamino)-s-triazine, and 2-chloro-4-ethylamino-6-isopropylamino-s-triazine; and, For the control of annual and perennial grasses as post-emergence treatments: sodium-2,2 dichloropropionate,3-amino-1,2,4 triazole, and dimethylarsinic acid.

The latter two active ingredients are also useful in obtaining effective control or broadleaf weeds by post-emergence treatments.

While surface active agents may be used with the herbicidal compositions of the present invention, the use of such agents is governed by the nature of the herbicide and mode of action. Thus, if pre-emergence effects are desired, very little, if any, surface active agent will be utilized since it is not generally preferred that pre-emergence herbicides be as readily released, as for example, post-emergence herbicides.

Materials such as talc, fuller's earth, kieselguhr, diatomaceous earth, volcanic sand, pumices, chalk, woodflower, nutshell flower, charcoal, inorganic phosphates, magnesium carbonates, bentonite and pyrophyllites have all been used heretofore as carriers for herbicides in dust formulations. However, such herbicides have a size in the order of from 2 to 40 microns in diameter with the average size being from 6 to 8 microns and therefore are prone to release dust when applied. Some of the above materials such as talc, and fuller's earth have also been found to adsorb sticking agents; however, none of these materials will retain sticking agents and active herbicide ingredients to the desirable degree to which they are retained by vermiculite and still provide a dry, dust-free, lighter weight, free-flowing, granular composition. Prior dry herbicides made with these carriers have not been dust-free nor long acting, and have had the problems and shortcomings of prior dry formulations discussed above. Perlite, while operative as a carrier in my improved compositions because it is capable of adsorbing sticking agents, but to a lesser degree than vermiculite, is inferior to vermiculite because of its physical characteristics.

The organo arsenicals that may be used in this invention include those herbicidal compositions comprising a mixture of at least one arsonic compound selected from the group consisting of arsonic acids having the formula:

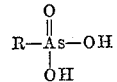

where R is an aliphatic group selected from the group consisting of methyl, ethyl, propyl and butyl, and salts thereof. Of the compounds included in the above group, disodium methyl arsonate has given particularly good results. The arsonate may be either in the anhydrous or in the hydrate form without detracting from herbicidal properties of the compound. For a complete description of the above organo arsenicals, reference should be had to United States Patent 2,678,265 issued May 11, 1954, to Arthur Schwerdle.

Other arsenical compounds of the arsonic acid type could be used, but the simpler organo-arsenic compounds discussed above are less expensive to make and evidence less toxicity to mammals than alternative arsenic compounds.

It has been discovered that the effectiveness of the herbicidal compound used may be increased by the addition of a surface-active agent in the formulation. The surface-active agents used can be of the anionic, cationic or nonionic type; however, the anionic and nonionic agents have given better results. Examples of suitable surface-active agents are alkyl aryl sulfonates, polyether alcohols, sulphated alkyl esters, and sodium lauryl sulphate. In general, less than 0.75 part by weight of surface-active agent in the herbicidal composition would be relatively ineffective and more than 30 parts would result in turf injury. In practicing the invention, the surface-active agent may either be dissolved in the polyhydric alcohol, or it may be admixed with the herbicide and vermiculite as will be hereinafter described. A surface-active agent which has given excellent results in the practice of this invention has been alkyl benzene sodium sulfonate. For a complete description of this surface-active agent, reference should be had to United States Patent 2,689,173. For a list of surface-active agents available to the trade, reference should be had to "Synthetic Detergents: The Boom Won't Wash Out," reprinted from "Chemical Week," copyright 1955, by McGraw-Hill Publishing Company, Inc., 330 West 42nd Street, New York 36, New York. Another reference is "Surface Active Agents, Their Chemistry and Technology," by Schwartz and Perry; published by Interscience Publishers, Inc., 1949.

Specific examples of other surface-active agents utilized in the present invention are substituted amide of alkyl phosphate (Victamine-C, Victor Chemical Work), lauric acid, diethanol amide, quarternary ammonium compound (Sapamine KWC, Ciba Co.), alkyl phenol polyglycol ether, and polyethoxylated tridecyl alcohol. Victamine and Sapamine are registered trademarks.)

To impart desirable color, and for identification purposes, a suitable dye may be added to the herbicidal composition. Examples of such dyes are malachite green, auramine, and crystal violet.

The following example is illustrative of the practice of this invention:

EXAMPLE I

| | |
|---|---|
| Vermiculite (No. 4) _____ft.³__ | 51.0 |
| Hexylene glycol (2-methyl-2,4-pentanediol) __lbs__ | 34.0 |
| Dye mix _____ozs__ | 26.0 |
| 85% malachite green | |
| 15% methyl violet | |
| Alkyl benzene sodium sulfonate (85%-active) lbs__ | 15.0 |
| Disodium methyl arsonate hexahydrate (50%) lbs__ | 40.0 |

Using the above formulation, the alkyl benzene sodium sulfonate and disodium methyl arsonate hexahydrate were milled in a "Mikro" pulverizer until a homogeneous mixture having a fine −100 U.S. standard consistency was obtained. Of course other types of well known pulverizing apparatus such as a ball mill may be used. This mixture was added to the vermiculite and mixed in a ribbon blender for a 2 minute interval. After mixing for 2 minutes, the hexylene glycol to which the dye had been added, was sprayed over the mixture. The hexylene glycol was at a temperature of about 40° C. Mixing was continued for an additional 30 seconds. The result is a free-flowing substantially dust-free herbicidal composition having a volume of approximately 45 cubic feet, and 1.7% active. A convenient method for varying the concentration of active ingredients in the final product is to vary the amount of vermiculite which is treated.

It is to be understood, of course, that the ratios of ingredients in the above formulation may be varied to provide a herbicidal composition of desired toxicity as is known by those skilled in the art. The amount of herbicidally active compounds present in the compositions as actually applied for destroying, inhibiting or preventing growth of noxious weeds and grasses will vary with the herbicidal activity of the active ingredients and the particular plants which are to be controlled. The organo arsenical herbicidal compositions of the present invention as applied preferably contain from 5 to 30 parts by weight of herbicidally active ingredient; from 10 to 50 parts by weight of the polyhydric alcohol sticking agent; when combined with 500 parts by weight of a solid carrier material such as vermiculite capable of adsorbing the polyhydric alcohol. Other solid carrier material such as perlite which will adsorb a film of sticking agent sufficiently to provide a free-flowing finely divided substantially dust-free formulation, even though inferior to vermiculite, are contemplated as within the scope of the present invention. When used, larger proportions of other insoluble herbicidally active ingredients are preferable, as illustrated by the examples set forth below.

It has been found that substantially all of the sticking agent is retained on the vermiculite particles by adsorption of the thin film of sticking agent in contact on the vermiculite surfaces to the substantial exclusion of sticking agent absorption, and additional amounts of sticking agent adhere to the adsorbed film by intermolecular attraction. It is possible to use from 10 to 150 parts or more by weight of the sticking agent for operative results, but the preferred range of sticking agent is from 10 to 50 parts by weight. Greater amounts increase costs unnecessarily and may result in turf injury.

Examples of the amount of organo arsenical which will be effective in the control of crabgrass are set forth in aforementioned Patent No. 2,678,265. More especially, for example, for the sodium methyl arsonate type herbicide, that patent discloses application to 20 sq. ft. of turf of a thousand cc. of a solution having a concentration of one part of this organo arsenical to 500 parts water [1:500] as a usable lower limit, and 1 part of this organo arsenical to 250 parts water [1:250] as a usable upper limit. This is equivalent to from 2 to 4 grams active sodium methyl arsonate type herbicide per thousand cc. of water, which is applied to a 20 sq. ft. turf area. That is in turn equivalent to from 0.1 to 0.2 gram dry active organo arsenical herbicide per sq. ft. of turf treated.

The following tables are illustrative of some of the results obtained in extensive experimental turf plot work with the herbicidal compositions of this invention. In the tables listed, the formulation of Example 1 was applied to turf infested with noxious grass at a rate of 480 cubic inches, equivalent to approximately 4.5 lbs per 1000 sq. ft. for each treatment. The equivalent rate of disodium methyl arsonate was applied in spray form in 5 gallons of water per 100 sq. ft. for a same total of 2 to 3 treatments repeated at 5 to 7 day intervals. Unless otherwise specified, all treatments were applied to damp or moist turf.

Control is based on the area covered by undesirable grasses in the treated plots compared to the check plots at the indicated observation date. Turf injury is expressed as a percent reduction in density of desirable turf grasses following eradication of the undesirable grasses after allowing for an interval of recovery.

*Table No. I*

TREATMENT APPLIED TO BOTH MOIST AND DRY KENTUCKY BLUEGRASS—COLONIAL BENT TURF INFESTED WITH CRABGRASS AT A LOW SOIL MOISTURE LEVEL DURING LATE AUGUST

Initial treatment: August 19
Number of treatments: 3
Interval between treatments: 5 days

| Method | Observed | |
|---|---|---|
| | Oct. 3, percent Control | Oct. 3, percent Injury |
| Dry formulation 1.7% active_____ | 100 | 20 |
| Spray_____ | 100 | 40 |
| Dry formulation 1.7% active ¹_____ | 100 | 10 |

¹ Applied to dry foliage.

*Table No. II*

TREATMENT TO IRRIGATED KENTUCKY BLUEGRASS TURF INFESTED WITH CRABGRASS IN LATE AUGUST AND EARLY SEPTEMBER

Initial treatment: August 24
Number of treatments: 3
Interval between treatments: 7 days

| Method | Observed | |
|---|---|---|
| | Sept. 21, percent control | Sept. 21, percent injury |
| Dry formulation 1.7% active_____ | 90 | 10 |
| Spray_____ | 99 | 30 |

*Table No. III*

TREATMENT TO KENTUCKY BLUEGRASS TURF INFESTED WITH CRABGRASS AT LOW SOIL MOISTURE LEVEL IN LATE AUGUST AND EARLY SEPTEMBER

Initial treatment: August 24
Number of treatments: 3
Interval between treatments: 7 days

| Method | Observed | |
|---|---|---|
| | Sept. 21, percent control | Sept. 21, percent injury |
| Dry formulation 1.7% active_____ | 92 | 20 |
| Spray_____ | 98 | 40 |

Table No. IV

TREATMENT TO IRRIGATED BENTGRASS TURF INFESTED WITH CRABGRASS DURING LATE AUGUST AND EARLY SEPTEMBER

Initial treatment: August 27
Number of treatments: 3
Interval between treatments: 7 days

| Method | Observed | |
|---|---|---|
| | Sept. 22, percent control | Sept. 22, percent injury |
| Dry formulation 1.7% active | 99 | 80–90 |
| Spray | 99 | 90–100 |

Table No. V

TREATMENT TO SEEDLING KENTUCKY BLUEGRASS BENTGRASS TURF AT MEDIUM TO HIGH SOIL MOISTURE LEVEL INFESTED WITH GOOSEGRASS IN MID-JUNE

Initial treatment: June 14
Number of treatments: 3
Interval between treatments: 7 days

| Method | Observed | |
|---|---|---|
| | July 6, percent control | July 6, percent injury |
| Dry formulation 3.4% active | 99 | [1] 30 |

[1] Although turf injury resulted from treatment, the desirable turf grasses survived the summer in the treated areas whereas all turf was lost in the nontreated areas due to the heavy infestation of annual grassy weeds.

Table No. VI

TREATMENT APPLIED TO BOTH MOIST AND DRY KENTUCKY BLUEGRASS TURF INFESTED WITH FOXTAIL AT LOW SOIL MOISTURE LEVEL DURING LATE AUGUST AND EARLY SEPTEMBER

Initial treatment: August 29
Number of treatments: 3
Interval between treatments: 7 days

| Method | Observed | |
|---|---|---|
| | Sept. 21, percent control | Sept. 21, percent injury |
| Moist foliage: | | |
|   Dry formulation 1.7% active | 99 | 10 |
|   Spray | 99 | 20 |
| Dry foliage: | | |
|   Dry formulation 1.7% active | 86 | 0 |
|   Spray | 99 | 20 |

Table No. VII

TREATMENT TO BOTH MOIST AND DRY KENTUCKY BLUEGRASS TURF INFESTED WITH PASPALUM SPECIES AT LOW SOIL MOISTURE LEVEL DURING LATE AUGUST AND EARLY SEPTEMBER

Initial treatment: August 29
Number of treatments: 3
Interval between treatments: 7 days

| Method | Observed | |
|---|---|---|
| | Sept. 21, percent control | Sept. 21, percent injury |
| Moist turf: | | |
|   Dry formulation 1.7% active | 99 | 10 |
|   Spray | 99 | 15 |
| Dry turf: | | |
|   Dry formulation 1.7% active | 99 | 10 |
|   Spray | 99 | 15 |

The above tables illustrate the percent control of undesirable grasses obtained with the dry formulation of this invention. These tables also show that while herbicidal effectiveness of this dry formulation compares favorably with a spray formulation of equal strength, the percent injury to the desirable turf grasses is less with the herbicidal composition of this invention than with a spray formulation of equal strength. The above tables represent only a small part of the experimentation conducted with the herbicidal compositions of this invention, but they conclusively establish the value of the dry herbicide of this invention for selective post-emergence treatments in controlling certain weedy grasses in turf area.

Turf grasses such as bentgrass, creeping fescues, Kentucky bluegrass, and *Poa trivialis* may be discolored or injured. However, a high degree of selectivity is not essential due to the discoloration associated with the destruction of the weedy grass plants which often comprise the greater part of the infested turf. The rapid killing action resulting from treatments with the compositions of this invention is an advantage in late season weedy grass control since less time is required for destruction of the weedy grasses, thus expediting the recovery or renovation of surrounding turf.

In the preferred above-disclosed herbicide, the active ingredient is disodium methyl arsonate, which may be either in the anhydrous or hydrate form. The surface active agents increase the effectiveness of the active ingredient by enabling better absorption by the plant, presumably by acting on the lipids of the cell walls and on the cutinaceous coatings of the foliage surface. The surface-active agent also increases effectiveness by reducing surface tension of moisture which comes into contact with the herbicide. This provides for a wider and more effective distribution of the active ingredient over the plant. The vermiculite acts as the carrier, and the glycol or polyhydric alcohol acts as a sticking agent which causes the finely powdered active ingredient to firmly adhere to the vermiculite particles. According to all indications, the glycol or polyhydric alcohol is adsorbed on the vermiculite. (Results with the disodium methyl arsonate impregnated directly on the vermiculite carrier without the use of a polyhydric alcohol as sticking or adhering agent have been very poor in comparison to the above discussed vermiculite-polyhydric alcohol-arsonate herbicide of this invention.)

Examples of other formulations of the present invention and relative proportional ingredient amounts follow.

EXAMPLE 2

| | Preferred range | Preferred parts by weight |
|---|---|---|
| Disodium methyl arsonate | 5–30 | 15 |
| Alkyl benzene sodium sulfonate | .75–30 | 15 |
| Hexylene glycol | 10–50 | 22 |
| Vermiculite | 500 | 500 |

EXAMPLE 3

| | | |
|---|---|---|
| Disodium methyl arsonate | 5–30 | 15 |
| Quaternary ammonium compound [1] | .75–30 | 15 |
| Hexylene glycol | 10–50 | 22 |
| Vermiculite | 500 | 500 |

[1] (Sapamine KWC-Ciba Co.) Sapamine is a registered trademark and is a cationic detergent with the general formula:

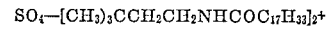

$$SO_4-[(CH_3)_3CCH_2CH_2NHCOC_{17}H_{33}]_2^+$$

EXAMPLE 4

| | | |
|---|---|---|
| Disodium methyl arsonate | 5–30 | 15 |
| Lauric acid diethanol amide | .75–30 | 15 |
| Hexylene glycol | 10–50 | 22 |
| Vermiculite | 500 | 500 |

EXAMPLE 5

| | | |
|---|---|---|
| Disodium methyl arsonate | 5–30 | 15 |
| Alkyl phenol polyglycol ether | .75–30 | 15 |
| Hexylene glycol | 10–50 | 22 |
| Vermiculite | 500 | 500 |

EXAMPLE 6

| | | |
|---|---|---|
| Disodium methyl arsonate | 5-30 | 15 |
| Polyethoxylated tridecyl alcohol | .75-30 | 15 |
| Hexylene glycol | 10-50 | 22 |
| Vermiculite | 500 | 500 |

EXAMPLE 7

| | | |
|---|---|---|
| Disodium methyl arsonate | 5-30 | 15 |
| Alkyl benzene sodium sulfonate | .75-30 | 15 |
| Ethylene glycol | 10-50 | 26 |
| Vermiculite | 500 | 500 |

EXAMPLE 8

| | | |
|---|---|---|
| Disodium methyl arsonate | 5-30 | 15 |
| Alkyl benzene sodium sulfonate | .75-30 | 15 |
| Polyethylene glycol 600 | 10-50 | 26 |
| Vermiculite | 500 | 500 |

EXAMPLE 9

| | | |
|---|---|---|
| Disodium methyl arsonate | 5-30 | 15 |
| Substituted oxazoline [2] | .75-30 | 15 |
| Hexylene glycol | 10-50 | 22 |
| Vermiculte | 500 | 500 |

[2] (Alkaterge-E, Commercial Solvents Corp.) Alkaterge is a registered trademark.

EXAMPLE 10

| | | |
|---|---|---|
| Disodium methyl arsonate | 5-30 | 15 |
| Alkyl dimethylbenzyl ammonium chloride | .75-30 | 15 |
| Hexylene glycol | 10-50 | 22 |
| Vermiculite | 500 | 500 |

EXAMPLE 11

| | | |
|---|---|---|
| Disodium methyl arsonate | 5-30 | 15 |
| Substituted amide of alkyl phosphate [3] | .75-30 | 15 |
| Hexylene glycol | 10-50 | 22 |
| Vermiculite | 500 | 500 |

[3] Victamine-C is a cationic wetting agent of the type

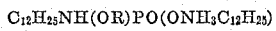

$C_{12}H_{25}NH(OR)PO(ONH_3C_{12}H_{25})$ where R is a water solubilizing group.

EXAMPLE 12

| | | |
|---|---|---|
| Disodium methyl arsonate | 5-30 | 15 |
| N(Lauroyl colamino formyl methyl) pyridinium chloride | .75-30 | 15 |
| Hexylene glycol | 10-50 | 22 |
| Vermiculite | 500 | 500 |

The following tables illustrate the control of crabgrass with the above example formulations differing in the surface-active agent used as follows:

Table VIII

| Example No. | Ionic activity (SAA) | Percent crabgrass control |
|---|---|---|
| 2 | Anionic | 76 |
| 3 | Cationic | 15 |
| 4 | Nonionic | 79 |
| 5 | do | 60 |
| 6 | do | 72 |

A total of two applications of each formulation was applied to well established crabgrass (*Digitaria sanquinalis*) and Kentucky bluegrass turf on March 7 and March 14, 1960. The crabgrass seed for these tests was planted in 4¾ x 6¼ inch containers in the greenhouse on January 27, 1960. The crabgrass plants were well established and had been mowed to a height of 1½ inches several times before the first treatment was applied on March 7, 1960. Each treatment was replicated 3 times.

Table IX (Examples Differing in Sticking Agent)

| Example No.: | Percent crabgrass control |
|---|---|
| 2 | 78 |
| 7 | 71 |
| 8 | 78 |

A total of two applications of each formulation was applied to well established crabgrass (*Digitaria sanquinalis*) planted on January 27, 1960, in the manner specified in regard to Table VIII, on March 22 and March 28, 1960. Each treatment was replicated 3 times.

Table X-A (Examples Differing in Surface Active Agent)

| Example No. | Ionic activity (SAA) | Percent crabgrass control |
|---|---|---|
| 2 | Anionic | 72 |
| 9 | Cationic | 7 |
| 10 | do | 7 |
| 11 | do | 25 |
| 12 | do | 0 |

A total of two applications of each formulation was applied to well established crabgrass (*Digitaria sanquinalis*) on June 6 and July 7, 1960. Crabgrass seed for the test was planted in 6⅛" containers in the greenhouse on January 27, 1960. The crabgrass plants were mature and producing seed before the first treatment was applied on June 27. Each treatment was replicated 3 times.

The Table X-A test results illustrate that best results are obtained by nonionic and anionic surface active agents with disodium methyl arsonate. A synergistic effect is attributed to the anionic and nonionic materials whereas, to accomplish the same results with the cationic surface active agent, larger quantities are required of the herbicide.

Table X-B (Examples Differing in Surface Active Agent)

| Example No. | Ionic activity (SAA) | Percent crabgrass control |
|---|---|---|
| 2 | Anionic | 98 |
| 9 | Cationic | 75 |
| 10 | do | 69 |
| 11 | do | 78 |
| 12 | do | 99 |

A total of two applications of each formulation was applied to well established crabgrass (*Digitaria sanquinalis*) on July 18 and July 23, 1960. Crabgrass seed for the test was planted in 4¾ x 6¼ inch containers in the greenhouse on June 22, 1960. The crabgrass plants were in the early branching stage of development when the first treatment was applied on July 18. Each treatment was replicated 3 times.

The significance of the results recorded in Table X-B is that the cationic surface active agents are shown to contribute to the herbicidal activity of the example formulations. The difference in degree of activity in Tables X-A and X-B is probably due ot the difference in maturity of the crabgrass tested and reported in Table X-A.

The following examples further illustrate the herbicidal compositions of the present invention.

EXAMPLE 13

| | Parts By weight | Preferred range |
|---|---|---|
| Diphenylacetonitrile | 94 | 20-190 |
| Hexylene glycol | 19 | 10-50 |
| Vermiculite | 500 | 500 |

EXAMPLE 14

| 3-amino-1,2,4-triazole | 83 | 16-250 |
| --- | --- | --- |
| Alkyl benzene sodium sulfonate | 74 | 15-100 |
| Hexylene glycol | 32 | 10-50 |
| Vermiculite | 500 | 500 |

EXAMPLE 15

| Dimethyl tetrachloroterephthalate | 23 | 6-90 |
| --- | --- | --- |
| Hexylene glycol | 37 | 10-50 |
| Vermiculite | 500 | 500 |

EXAMPLE 16

| Sodium-2,2-dichloropropionate | 13 | 4-65 |
| --- | --- | --- |
| Alkyl benzene sodium sulfonate | 81 | 20-100 |
| Hexylene glycol | 17 | 10-50 |
| Vermiculite | 500 | 500 |

EXAMPLE 17

| 2-chloro-4,6-bis(ethylamino)-s-triazine | .5 | 2-40 |
| --- | --- | --- |
| Hexylene glycol | 13 | 10-50 |
| Vermiculite | 500 | 500 |

EXAMPLE 18

| 2 - chloro - 4 - ethylamino - 6 - isopropylamino - s-triazine | 5 | 2-40 |
| --- | --- | --- |
| Hexylene glycol | 19 | 10-50 |
| Vermiculite | 500 | 500 |

EXAMPLE 19

| Dimethylarsinic acid | 63 | 10-260 |
| --- | --- | --- |
| Alkyl benzene sodium sulfonate | 41 | 7-100 |
| Hexylene glycol | 33 | 10-50 |
| Vermiculite | 500 | 500 |

The dry free-flowing substantially dust-free formulations of this invention may be selected as to active ingredient as above noted, to provide very effective post emergence control of monocots (grassy weeds) and dicots (broadleaf weeds) and the preemergence control of germinating weed seeds. The compositions disclosed herein act on the plant surface at or near the soil surface for substantial periods of time thereby resulting in the maintenance of a high level of toxic material in intimate association with the plant to furnish the necessary killing action.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A free-flowing, granular, substantially dust-free composition of matter comprising a carrier of finely divided expanded vermiculite particles substantially all of which are greater than 150 microns in diameter; a film of a low volatile sticking agent adsorbed on the surfaces of said vermiculite to the substantial exclusion of absorbed sticking agent; and a herbicide which is substantially insoluble in said sticking agent in an amount sufficient to be toxic to selected plants; in which composition undissolved particles of said herbicide are retained on the vermiculite by means of said film of sticking agent; said herbicide being releasable from said carrier by moisture.

2. The composition of claim 1 wherein the sticking agent comprises a polyhydric alcohol.

3. The composition of claim 2 wherein the herbicide is at least one of the compounds selected from the group consisting of arsonic acids having the formula:

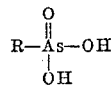

where R is an aliphatic radical selected from the group consisting of methyl, ethyl, propyl and butyl, and herbicidally active salts thereof.

4. The composition as defined in claim 1 wherein said herbicide is selected from the group consisting of diphenylacetonitrile,
dimethyl tetrachloroterephthalate,
2-chloro-4,6-bis (ethylamino)-s-triazine,
2-chloro-4-ethylamino-6-isopropylamino-s-triazine,
3-amino-1,2,4-triazole,
sodium-2,2-dichloropropionate, and
dimethylarsinic acid.

5. The composition as defined in claim 1 wherein the ingredients are present in the following amounts:

| Dimethyl tetrachloroterephthalate | 6-90 |
| --- | --- |
| Hexylene glycol | 10-50 |
| Vermiculite | 500 |

6. The composition as defined in claim 1 wherein the ingredients are present in the following amounts:

| 2 - chloro - 4 - ethylamino - 6 - isopropylamino - s-triazine | 2-40 |
| --- | --- |
| Hexylene glycol | 10-50 |
| Vermiculite | 500 |

7. A free-flowing, granular, substantially dust-free composition of matter comprising a carrier of finely divided expanded vermiculite particles substantially all of which are greater than 150 microns in diameter; a low volatile sticking agent on the surfaces of said vermiculite, substantially all of said sticking agent being adhered as a thin film on said vermiculite particle surfaces; a herbicide which is substantially insoluble in said sticking agent, in an amount sufficient to be toxic to selected plants; and a surface active agent; in which composition undissolved particles of said herbicide are retained on the vermiculite by means of said film of sticking agent; said herbicide being releasable from said carrier by moisture.

8. The composition of claim 7 wherein said sticking agent comprises a polyhydric alcohol.

9. The composition of claim 8 wherein the polyhydric alcohol is selected from the group consisting of ethylene, propylene, dipropylene, triethylene and hexylene glycols; 2,2-diethyl-1,3-propanediol; 2-ethyl-2-butyl-1,3-propanediol; 1,5-pentanediol; 2-ethyl-1,3-hexanediol; and higher molecular weight polyethylene and polypropylene glycols.

10. The composition of claim 8 wherein the herbicide is at least one compound selected from the group consisting of arsonic acids having the formula:

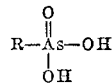

where R is an aliphatic radical selected from the group consisting of methyl, ethyl, propyl and butyl, and herbicidally active salts thereof.

11. The composition of claim 10 wherein said surface active agent is an alkyl benzene sodium sulfonate and the herbicide comprises disodium methyl arsonate.

12. The composition of claim 8 wherein said vermiculite is present in approximately 500 parts by weight and said polyhydric alcohol is present in approximately 10 to 50 parts by weight.

13. The composition as defined in claim 7 wherein the ingredients are present in the following proportions (parts by weight):

| | |
|---|---|
| Disodium methyl arsonate | 5–30 |
| Alkyl benzene sodium sulfonate | .75–30 |
| Hexylene glycol | 10–50 |
| Vermiculite | 500 |

14. A free-flowing, granular, substantially dust-free composition of matter comprising a carrier of finely divided expanded vermiculite particles substantially all of which are greater in size than 100 mesh U.S. sieve; a film of a low volatile sticking agent adsorbed on the surfaces of said vermiculite to the substantial exclusion of absorbed sticking agent; a herbicide which is substantially insoluble in said sticking agent, in an amount sufficient to be toxic to selected plants; and a surface active agent; in which composition undissolved particles of said herbicide are retained on the vermiculite by means of said film of sticking agent; said herbicide being releasable from said carrier by moisture.

15. A method of destroying noxious weeds comprising applying to said weeds a sufficient quantity to be toxic to said weeds of a free-flowing, granular, substantially dust-free composition of matter comprising a carrier of finely divided expanded vermiculite particles substantially all of which are greater than 150 microns in diameter; a film of a low volatile sticking agent adsorbed on the surfaces of said vermiculite particles to the substantial exclusion of absorbed sticking agent; and a herbicide which is substantially insoluble in said sticking agent in an amount sufficient to be toxic to said weeds; in which composition undissolved particles of said herbicide are retained on the vermiculite by means of said film of sticking agent; said herbicide being releasable from said carrier by moisture.

16. The method defined in claim 15 wherein the sticking agent comprises a polyhydric alcohol and the herbicide is at least one compound selected from the group consisting of arsonic acids having the formula:

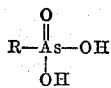

where R is an aliphatic radical selected from the group consisting of methyl, ethyl, propyl and butyl, and herbicidally active salts thereof.

17. A method of destroying noxious weeds comprising applying to said weeds a sufficient quantity to be toxic to said weeds of a free-flowing, granular, substantially dust-free composition of matter comprising a carrier of finely divided expanded vermiculite particles substantially all of which are greater than 150 microns in diameter; a low volatile sticking agent on the surfaces of said vermiculite particles, substantially all of said sticking agent being adhered as a thin film on said vermiculite particle surfaces; a herbicide which is substantially insoluble in said sticking agent in an amount sufficient to be toxic to said weeds; and a surface active agent; in which composition undissolved particles of said herbicide are retained on the vermiculite by means of said film of sticking agent; said herbicide being releasable from said carrier by moisture.

18. The method of claim 17 wherein said weeds are of the crabgrass variety; said sticking agent comprises a polyhydric alcohol; and the herbicide is at least one compound selected from the group consisting of arsonic acids having the formula:

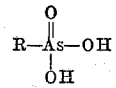

where R is an aliphatic radical selected from the group consisting of methyl, ethyl, propyl and butyl, and herbicidally active salts thereof.

19. The method of claim 18 wherein said surface active agent is an alkyl benzene sodium sulfonate and the herbicide comprises disodium methyl arsonate.

20. A free-flowing, granular, substantially dust-free composition of matter comprising a carrier of finely divided particles selected from the group consisting of expanded perlite and expanded vermiculite substantially all of which are greater than 150 microns in diameter; a film of a low volatile sticking agent adsorbed on the surfaces of said particles to the substantial exclusion of absorbed sticking agent; and a herbicide which is substantially insoluble in said sticking agent in an amount sufficient to be toxic to selected plants; in which composition undissolved particles of said herbicide are retained on the carrier by means of said film of sticking agent; said herbicide being releasable from said carrier by moisture.

21. A method of noxious weed control comprising pre-emergence applications of a free-flowing, granular, substantially dust-free composition of matter in an amount sufficient to inhibit weed growth comprising a carrier of finely divided expanded vermiculite particles substantially all of which are greater than 150 microns in diameter; a film of a low volatile sticking agent adsorbed on the surfaces of said vermiculite particles to the substantial exclusion of adsorbed sticking agent; and a herbicide which is substantially insoluble in said sticking agent in an amount sufficient to inhibit weed growth in which composition undissolved particles of said herbicide are retained on the vermiculite by means of said film of sticking agent; said herbicide being releasable from said carrier primarily by moisture in a manner to inhibit the weed growth.

22. A composition of matter as defined in claim 7, wherein said surface active agent is nonionic.

23. A composition of matter as defined in claim 7, wherein said surface active agent is anionic.

References Cited in the file of this patent

UNITED STATES PATENTS

| | | |
|---|---|---|
| 2,317,765 | Hester | Apr. 27, 1943 |
| 2,403,435 | Hammer | July 9, 1946 |
| 2,416,259 | Kagy | Feb. 18, 1947 |
| 2,642,354 | Barrons | June 16, 1953 |
| 2,670,282 | Allen | Feb. 23, 1954 |
| 2,678,265 | Schwerdle | May 11, 1954 |
| 2,875,119 | Trademan et al. | Feb. 24, 1959 |
| 2,875,120 | Trademan et al. | Feb. 24, 1959 |
| 2,891,855 | Gysin et al. | June 23, 1959 |
| 2,923,634 | Lindemann | Feb. 2, 1960 |

UNITED STATES PATENT OFFICE
CERTIFICATE OF CORRECTION

Patent No. 3,076,699                                                    February 5, 1963

Victor A. Renner

It is hereby certified that error appears in the above numbered patent requiring correction and that the said Letters Patent should read as corrected below.

Column 1, line 47, for "rfom" read -- from --; column 2, line 67, for "resutls" read -- results --; column 3, line 5, after "is" insert -- a --; line 47, for "cause" read -- causes --; column 6, line 19, for "100" read -- 1000 --; column 7, line 22, for "treatemnts" read -- treatments --; column 8, line 12, after "degree" strike out the comma; column 10, line 63, for "ot" read -- to --; column 12, line 23, for "fololwing" read -- following --.

Signed and sealed this 8th day of October 1963.

(SEAL)
Attest:

ERNEST W. SWIDER                                  EDWIN L. REYNOLDS
Attesting Officer                                   Acting Commissioner of Patents